3,339,365
SEWAGE DISPOSAL SYSTEM
Rupert H. Uden, Juniata, Nebr. 68955
Filed Dec. 21, 1964, Ser. No. 419,830
3 Claims. (Cl. 61—13)

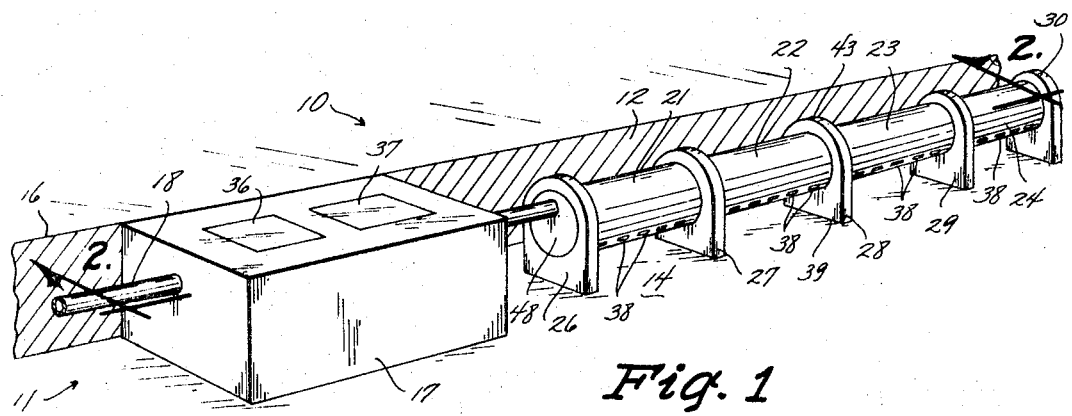
Fig. 1
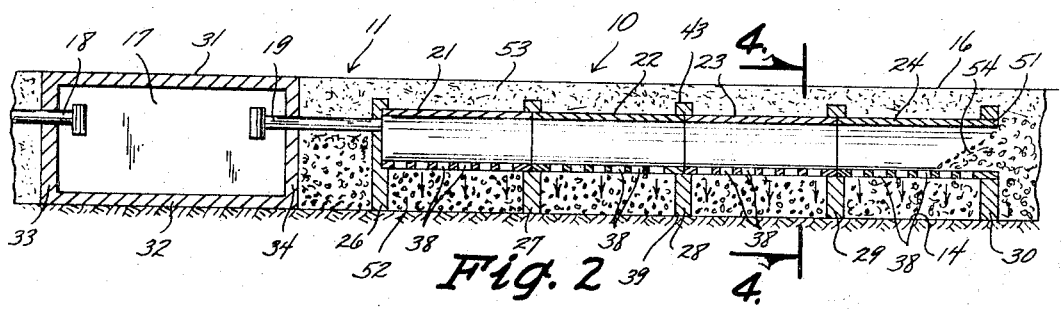
Fig. 2
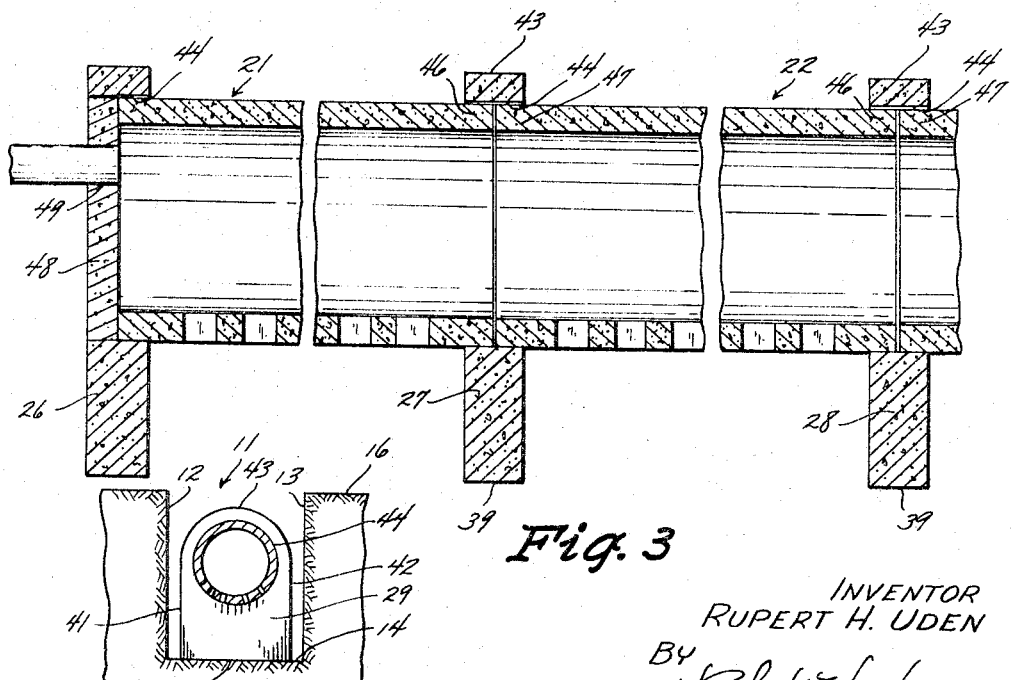
Fig. 3
Fig. 4
INVENTOR
RUPERT H. UDEN
BY
Robert Henderson
ATTORNEY United States Patent Office 3,339,365
Patented Sept. 5, 1967

This invention relates generally to the disposal of sewage, and more particularly to a sewage disposal system of a septic tank type wherein the liquid sewage is absorbed by the soil below the level thereof but near the surface.

In many areas where a septic tank type sewage disposal system is permitted, the system must of course be beneath the surface of the ground, must be subject to easy inspection and yet is limited as to the overall depth below the normal ground surface. It is an object of this invention to provide an improved sewage disposal system which satisfies all known sanitary requirements and restrictions, and yet which is economical to manufacture, rugged in structure, and effective in operation.

Another object of this invention is the provision of an improved sewage disposal system to a plurality of perforated pipes, the pipes being supported above a trench bottom by a plurality of risers, with each riser supporting contiguous ends of adjacent pipes.

Still another object of this invention is the provision of a sewage disposal system utilizing substantially all pre-cast concrete elements, and where the risers are substantially universal for use anywhere along the length of the pipes.

Yet another object of this invention is the provision of a sewage disposal system wherein a plurality of large-diameter concrete pipe, having perforated undersides, are supported above the ground surface of a trench, whereby gravel and other aggregate can readily and easily be filled in from above the trench, and worked beneath the perforated area of the pipes.

These objects and other features and advantages of this invention will become readily apparent upon reference to the following description when taken in conjunction with the accompanying drawings, wherein;

FIG. 1 is a perspective view of a preferred embodiment of this invention, shown placed within a trench provided therefor;

FIG. 2 is a sectional view taken along the line 2—2 in FIG. 1;

FIG. 3 is an enlarged fragmentary, foreshortened view of a detail of FIG. 2; and FIG. 4 is a sectional view taken along the lines 4—4 in FIG. 2.

Referring now to the drawings, a preferred embodiment of the sewage disposal system of this invention is illustrated generally at 10 in FIGS. 1 and 2. The system 10 is placed in a trench 11 (see also FIG. 4) having laterally spaced, vertically disposed side walls 12 and 13, and having a substantially level bottom 14. The depth of the trench 11, and also the width, is constant, in this instance being about three feet below the normal level 16 of the ground.

The sewage disposal system 10 comprises generally a septic tank 17 having a sewage inlet conduit 18 and an outlet or discharge conduit 19, and a plurality of perforated pipes 21, 22, 23, and 24 supported in an end-to-end, longitudinally aligned, position above the bottom 14 of the trench 11 by a plurality of risers 26, 27, 28, 29, and 30.

More particularly, the septic tank 17, of pre-cast concrete, has a top 31, bottom 32 and end walls 33 and 34, the latter having openings formed therein for receiving the conduits 18 and 19. The discharge conduit 19 is mounted slightly lower than the inlet conduit 18 for obvious reasons. Although the illustrated septic tank 17 is shown as an integral structure, having a pair of inspection openings 36 and 37 formed in the top 31 thereof, the invention is not to be so limited as there are other types of septic tanks which would be operable herein. It will be noted that the tank 17 has a depth of approximately four feet so that its top surface is substantially flush with the ground level 16.

Each pipe 21-24 being the same, only one will be described with like reference numerals indicating like elements. Pipe 23 for example is of pre-cast concrete, is approximately sixteen inches in outside diameter and three feet in length. The wall thickness is approximately two inches, and the pipe 23 has a constant inner and outer diameter. A plurality, four for example, of arcuately spaced rows (see FIG. 4) of longitudinally spaced apertures 38 are formed in one sidewall of the pipe to permit the flow therethrough of the liquid sewage being discharged through to the pipes from the conduit 19.

The risers 26-30 are basically identical in that each has a height of approximately thirty inches and a thickness of about four inches, with a flat bottom surface 39, vertically disposed sides 41 and 42 (FIG. 4), and a rounded upper surface 43. This structure enables the risers to be placed as illustrated on the trench bottom 14, and with their upper rounded surfaces some eight inches below the ground level 16.

Each riser 26-30 has a large circular opening 44 formed therein in the upper portion thereof above the bottom 39 and beneath and concentric with the rounded upper surface. By the opening 44 having a diameter slightly larger than the outer diameter of the pipes 21-24, it may readily be appreciated that a pipe will easily slip into and through an opening 44. By this arrangement, the pipes are placeable in an end-to-end, longitudinally aligned position, supported above the trench bottom 14, and with the contiguous ends 46 and 47 of adjacent pipes being supported in one opening 44 of one pipe (see FIG. 3).

The innermost riser 26 has a circular closure element 48 fitted into the opening 44 and of approximately one-half its thickness, with the element 48 having a small opening 49 (FIG. 3) formed therein for receiving the discharge conduit 19. The element 48 can be integral with the riser 26 if so desired. It will be noted the end 51 of the outermost pipe 29 is not enclosed.

In use, the system 10 is installed in the trench 11 as clearly illustrated. The apertures 38 face downwardly. Gravel 52 (FIG. 2) or other suitable aggregate is filled into the trench, and as the pipes 21-24 are spaced from the side walls 12 and 13 and the bottom 14 of the trench, the gravel may readily be directed beneath and about the pipes to form a filtration area. Soil 53 is then filled in over the gravel 52 until the pipe and risers are completely covered over. Gravel is permitted to form an enclosure 54 (FIG. 2) for the pipe outer end 51.

In view of the foregoing description, it may readily be appreciated that an extremely practical, effective, economical and easily installed sewage disposal, septic tank system is provided. Although a preferred embodiment of the invention has been described hereinbefore, it is to be remembered that various modifications and alterations can be made thereto without departing from the true spirit and scope of the invention as defined in the appended claims.

I claim:
1. A sewage disposal system comprising in combination:
   a septic tank unit having an inlet conduit and a discharge conduit;
   a plurality of identical, cylindrical pipes, each pipe having a plurality of apertures formed therein;
   means fluidly connecting one pipe to said discharge conduit; and a plurality of ground supported upright risers supporting said pipes upwardly spaced from the ground in an elevated position above the lower portions of the risers and in an end-to-end relationship, each riser having a 360° circular opening formed therethrough in the upper portion thereof into which contiguous ends of adjacent pipes are inserted and adjoined in abutting relationship, each said riser having a thickness longitudinally of said pipes for supporting said contiguous ends and for completely covering both longitudinally and circumferentially the junction of said pipe abutting ends.

2. A sewage disposal system comprising in combination:

a septic tank unit having an inlet conduit and a discharge conduit;

a plurality of identical, cylindrical pipes having a constant outer diameter, each pipe having a plurality of arcuately spaced rows of longitudinally spaced apertures formed therein;

a first riser having a bottom surface engageable with the ground, and having further a circular cutout formed in a side thereof for approximately half the thickness of said riser, said riser also having an opening formed in the other side thereof and open to said cutout, said cutout receiving said discharge conduit and said cutout supporting an end of one of said pipes; and a plurality of second risers, each second riser having a bottom surface engageable with the ground, and having a circular cutout formed therein into which contiguous ends of adjacent pipes are insertable, said contiguous ends being supported by said second risers whereby all said pipes are supported in an elevated position above the ground surface in an end-to-end longitudinally aligned position.

3. A sewage disposal system as defined in claim 2, and further wherein said pipes are supported with said apertures facing the ground.

References Cited

UNITED STATES PATENTS

| | | | |
|---|---|---|---|
| 89,630 | 5/1869 | Carlton | 61—10 |
| 2,054,703 | 9/1936 | Little et al. | 61—13 |
| 2,135,860 | 11/1938 | Taysen | 61—13 X |
| 2,767,801 | 10/1956 | Eads | 61—11 X |
| 2,802,339 | 8/1957 | Fogerty | 61—11 |
| 3,212,266 | 10/1965 | Thompson | 61—11 |
| 3,220,194 | 11/1965 | Lienard | 61—13 |

FOREIGN PATENTS

| | | |
|---|---|---|
| 956,046 | 4/1964 | Great Britain. |

EARL J. WITMER, *Primary Examiner.*